United States Patent [19]

Alejos

[11] Patent Number: 4,486,996
[45] Date of Patent: Dec. 11, 1984

[54] CONSTRUCTION-PANEL PREFABRICATION METHOD, PANELS THUS MADE AND EQUIPMENT FOR IMPLEMENTING SAID METHOD

[76] Inventor: Luis Alejos, Cadars, 82700 Montech, France

[21] Appl. No.: 379,707

[22] Filed: May 19, 1982

[51] Int. Cl.³ .................. B29D 27/04; E04C 1/00; B21D 7/024
[52] U.S. Cl. .................... 52/309.11; 29/445; 29/458; 29/460; 52/127.3; 52/309.12; 52/378; 52/408; 249/45; 249/61; 249/84; 264/46.4; 264/46.7; 264/221; 264/DIG. 44; 425/149; 425/817 R; 425/DIG. 12
[58] Field of Search ............. 264/46.7, 46.4, 46.8, 264/221, DIG. 44; 52/309.11, 309.12, 127.3, 378, 408; 29/445, 458, 460; 249/45, 84, 61; 425/149, 817 R, DIG. 12

[56] References Cited

U.S. PATENT DOCUMENTS

| | | | |
|---|---|---|---|
| 2,522,116 | 9/1950 | Hayes | 264/46.7 X |
| 2,955,972 | 10/1960 | Wintermute et al. | 264/46.8 X |
| 3,157,144 | 11/1964 | De Jarnett | 264/46.7 X |
| 3,239,982 | 3/1966 | Nicosia | 264/46.7 X |
| 3,270,103 | 8/1966 | Kurtz | 264/46.7 X |
| 3,305,991 | 2/1967 | Weismann | 264/46.7 X |
| 3,347,007 | 10/1967 | Hale | 52/378 X |
| 3,362,121 | 1/1968 | Weber | 52/378 X |
| 3,555,131 | 1/1971 | Weismann | 264/46.7 |
| 3,579,937 | 5/1971 | Lukens | 264/46.7 X |
| 3,772,129 | 11/1973 | Dover et al. | 264/46.7 X |
| 3,943,676 | 3/1976 | Ickes | 52/309.11 X |
| 4,104,842 | 8/1978 | Rockstead et al. | 52/309.12 X |
| 4,120,330 | 10/1978 | Weismann | 29/460 X |
| 4,125,981 | 11/1978 | MacLeod et al. | 52/309.12 |
| 4,297,820 | 11/1981 | Artzer | 52/309.11 |
| 4,336,676 | 6/1982 | Artzer | 52/309.11 X |
| 4,418,463 | 12/1983 | McNeill | 29/460 X |

Primary Examiner—Philip Anderson
Attorney, Agent, or Firm—Shlesinger, Arkwright, Garvey & Fado

[57] ABSTRACT

The invention relates to a factory prefabrication method for hollow panels for the on-site erection of insulated constructions.

This method employs a three-dimensional framework 1 composed of thrust bars arranged in two parallel planes and of link bars linking the former. The method consists in placing said framework in a mold 13 containing a pulverulent material 16 wherein the framework is embedded by part of its thickness, in molding an insulating synthetic material 4 in the empty part of the mold so as to embed the visible parts of the framework 1, in placing above the mold a form sheet 2 so that the insulating material shall make contact with it and adhere to it during hardening, and after this hardening, in extracting the pulverulent material and in ejecting the obtained panel. The panel so manufactured can be provided after ejection with a second form sheet opposite the first.

19 Claims, 16 Drawing Figures

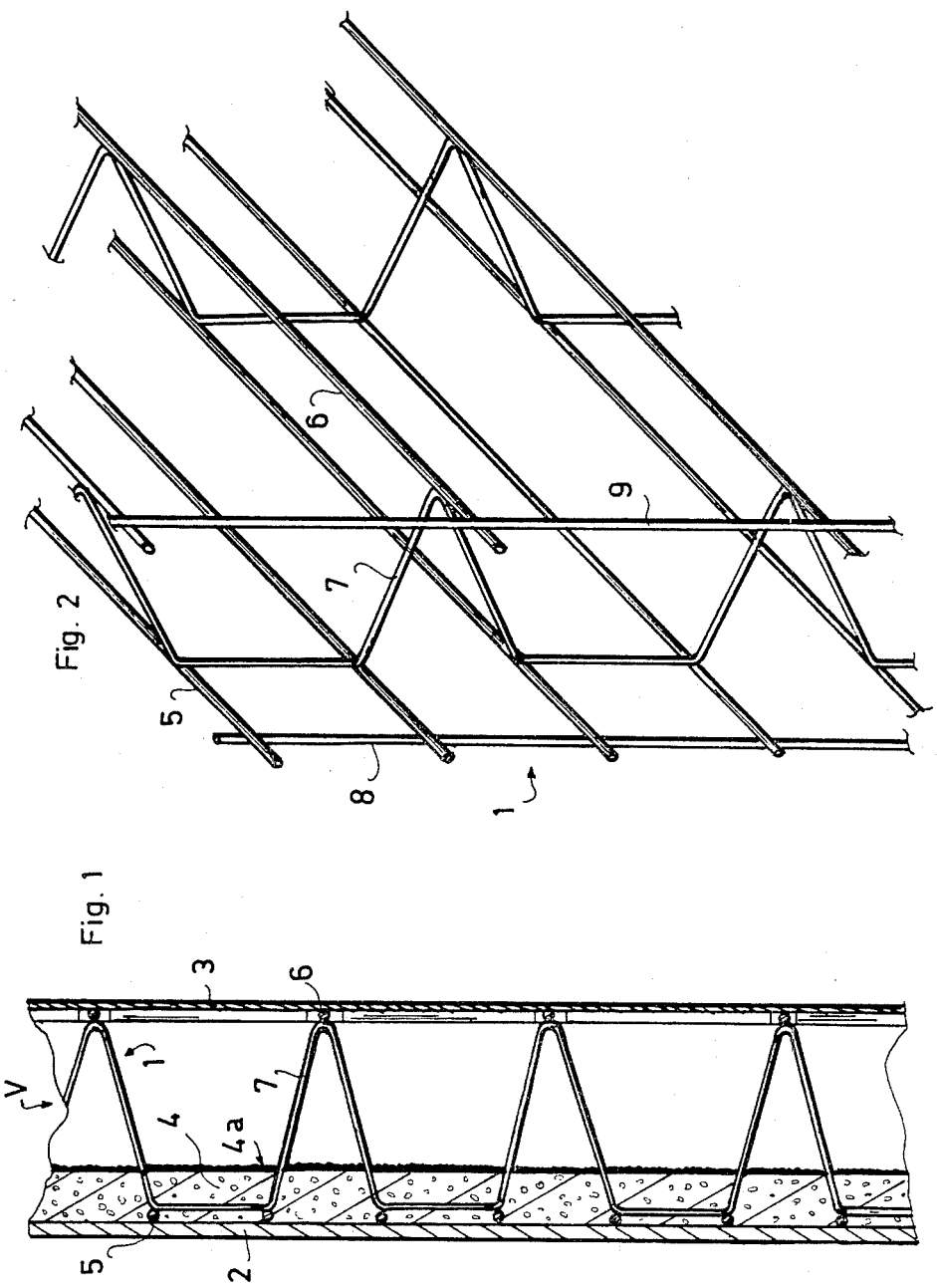

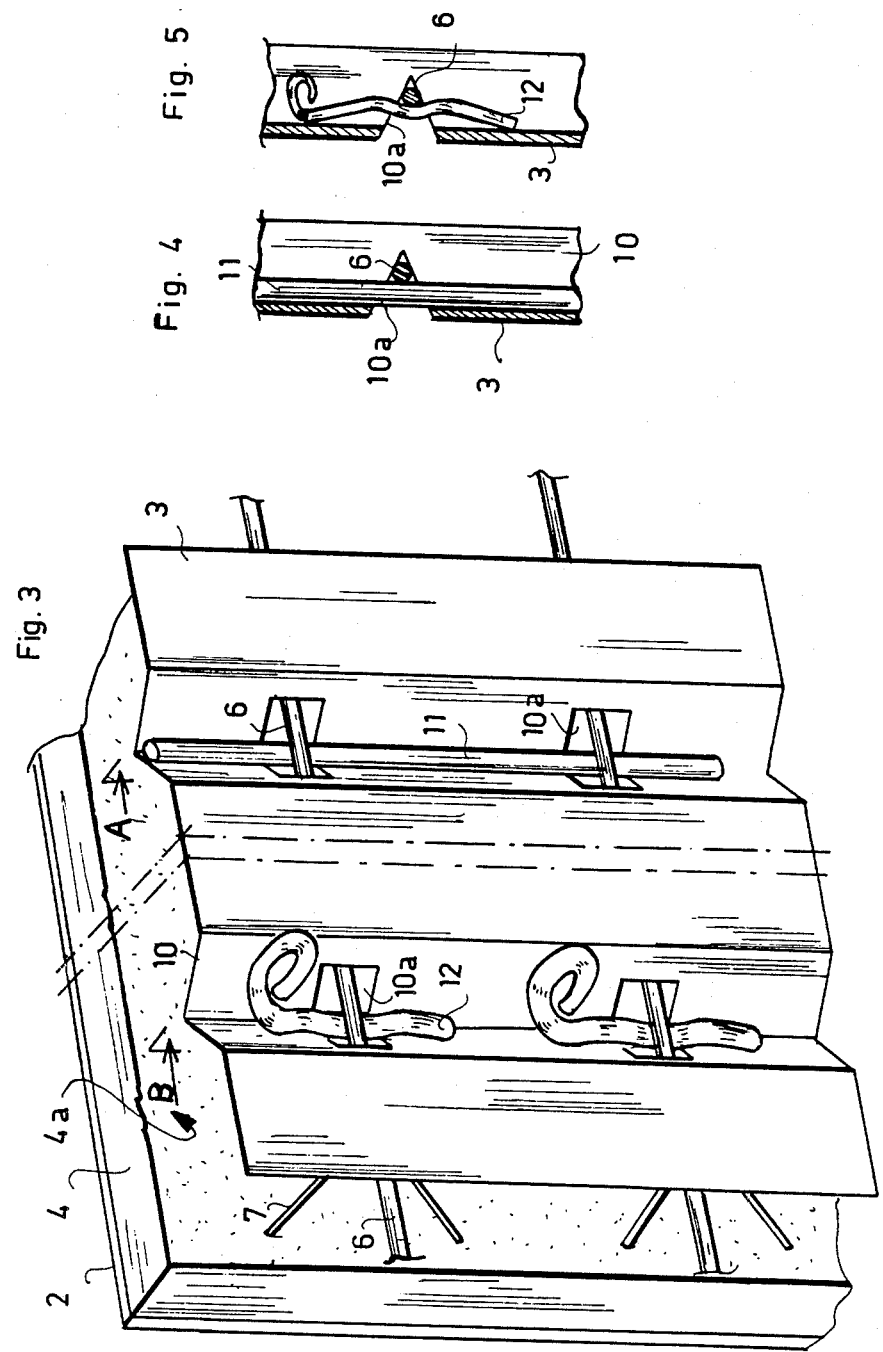

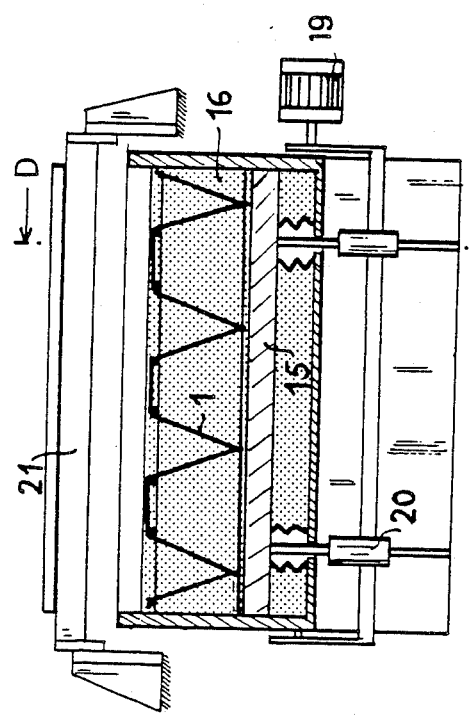
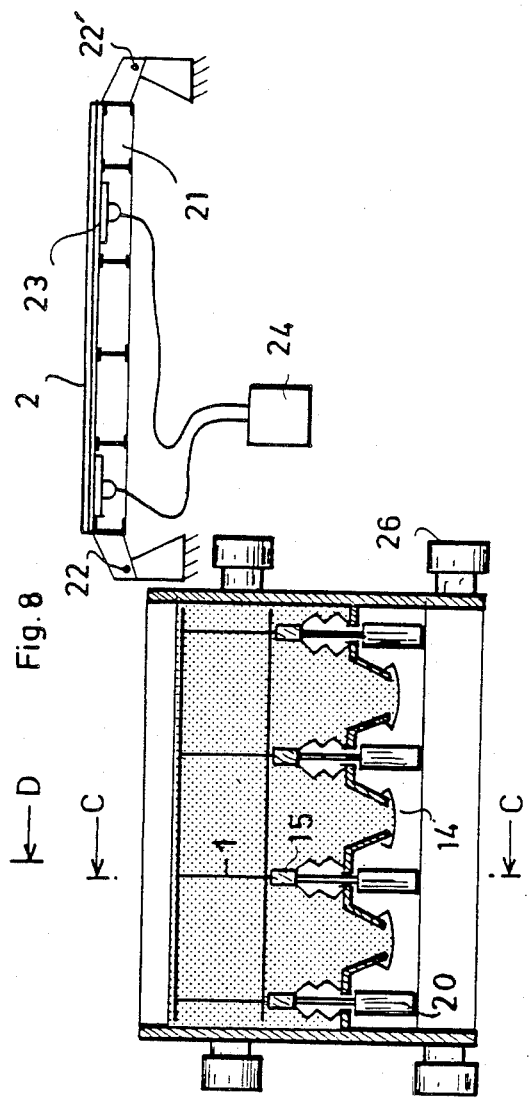
Fig.7
Fig.8

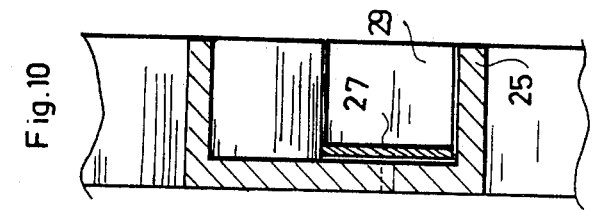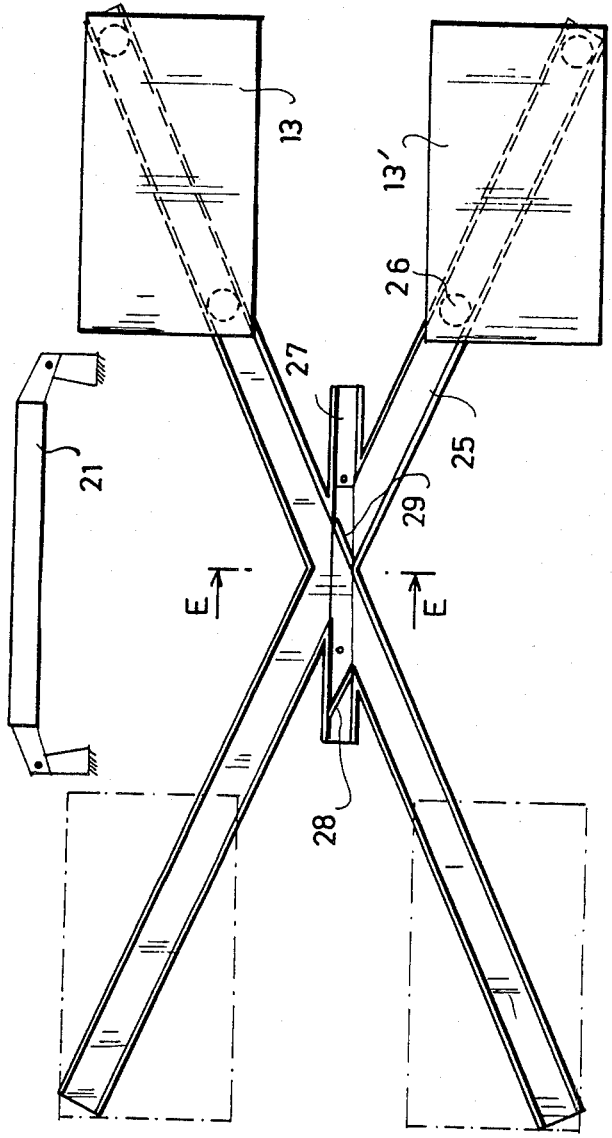

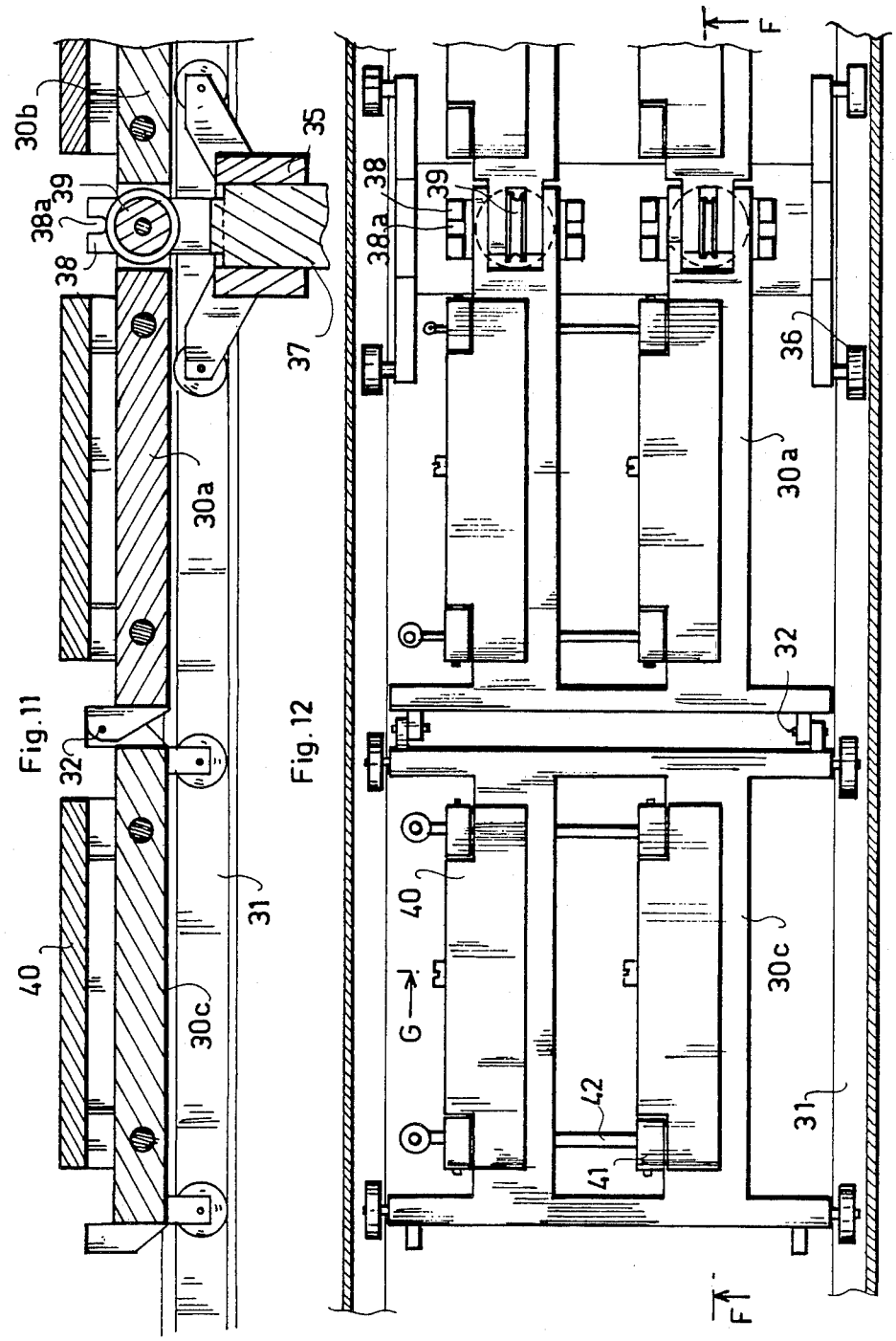

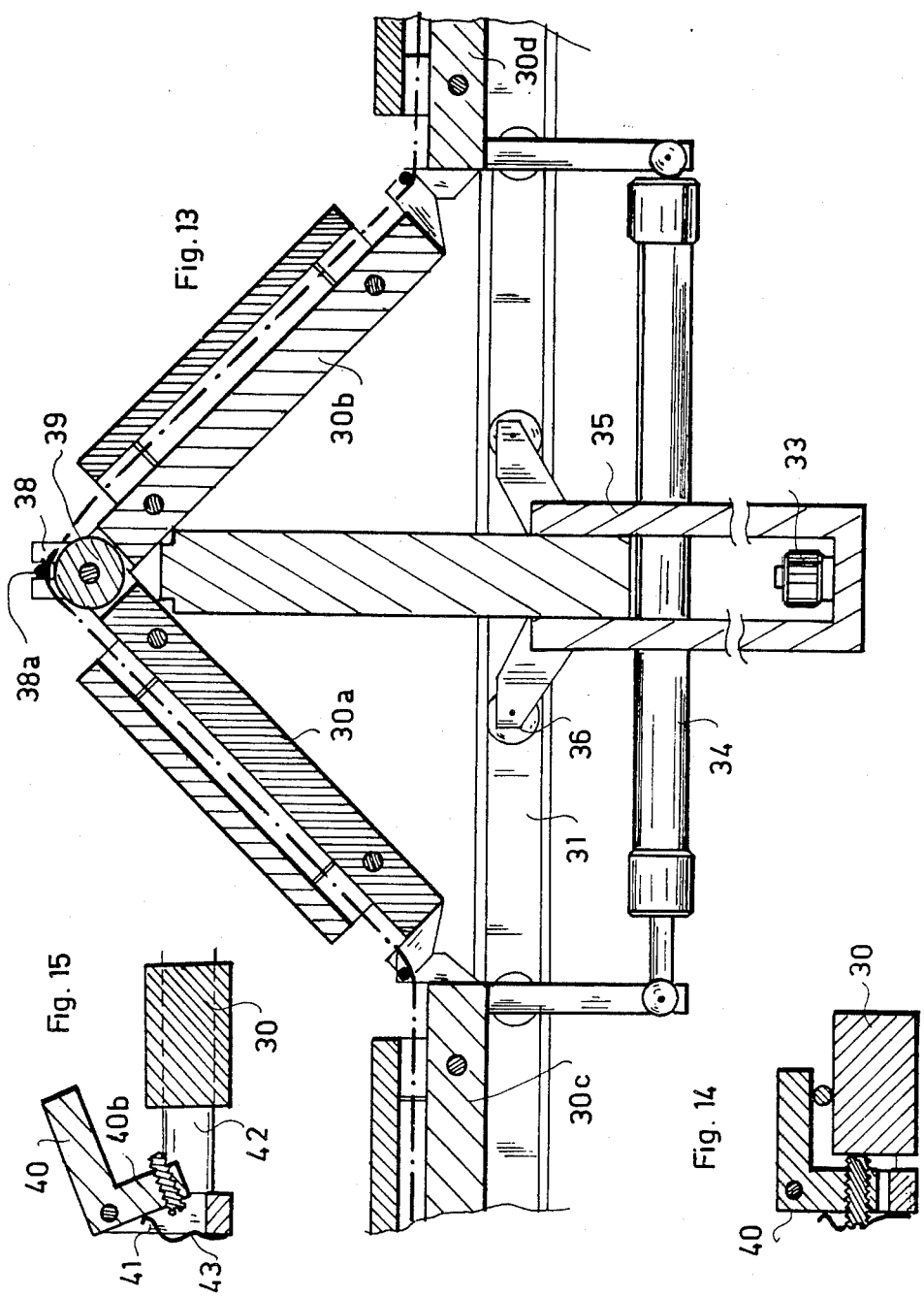

CONSTRUCTION-PANEL PREFABRICATION METHOD, PANELS THUS MADE AND EQUIPMENT FOR IMPLEMENTING SAID METHOD

The invention concerns a factory prefabrication method for hollow panels with thermal insulation for on-site erection. The invention also covers panels thus made and prefabrication equipment to implement the method.

The presently known construction methods using prefabricated panels suffer from serious drawbacks essentially caused by the weight and the bulk of the commercially available prefabricated panels. As a rule these panels are solid and they are made at the factory to form complete wall sections, by integrating the walls various elements, and in particular the support structure, the on-site construction method consisting in juxtaposing several panels and in assembling them by various procedures. These panels are exceedingly heavy and bulky, they require hoisting machinery to handle them and frequently pose serious on-site access problems. Moreover, it is difficult to caulk the joints between panels and often problems are associated with the application of a conventional coating to their surface. Also such prefabricated constructions are hardly appreciated by the customer who rather seeks more traditional type construction.

Under these conditions, many construction methods have been suggested to simplify the work of the contractor on site, while providing constructions with a traditional look. These methods generally make it possible to save much time by eliminating the conventional wood forms or planking; however, and this especially is the case when thermally insulated constructions must be erected, these procedures require carrying out delicate operations on site, demanding skilled labor and requiring the presence of special machinery not part of the equipment of most small contractors.

The U.S. Pat. No. 4,104,842, the German Pat. No. 1,804,657 or else the French Pat. No. 2,264,932 illustrate for instance this type of procedure, which consists in arranging at the location of the wall to be built a framework consisting of mutually fixed support bars, in spraying concrete from each side of the framework to form support panels on either side of the framework and then in injecting an insulating material between these support panels; in the French Pat. No. 2,264,932, successive layers of insulating and strong materials are sprayed so as to achieve a composite whole. Such spray and injection operations carried out on site substantially hinder the development of such procedures.

Other procedures, such as the one described in the French Pat. No. 2,344,691, also have already been proposed, but they are poorly suited to thermally insulated constructions and for such an eventuality if carried out on site become lengthy and delicate because requiring operations of emplacing the insulating material which in practice are difficult.

Again, it has been suggested in the French Pat. Nos. 2,436,854 and 2,437,473 to use prefabricated hollow panels, more lightweight than the solid panels already mentioned; however making these panels at the factory is fairly complex and their cost is high. Another drawback of the panels described in the French Pat. No. 2,436,854 is that their weight remains appreciable because they include at least one reinforced concrete slab.

Also, when the panels described in the French Pat. No. 2,437,473 are used, the concrete cast into the hollow volume of each panel provides only a very poor connection between the components of the panel because of the poor gripping of said concrete on the insulating layer.

It is the object of the present invention to offer a novel solution to the above cited construction problem by creating a novel prefabricated panel with the benefit of a low weight whereby it can be handled by one or two men without hoisting machinery.

Another essential object of the invention is to simplify the on-site construction labor and to make it possible to achieve large savings in time while allowing small contractors without special competencies or special machinery needed in the delicate operations of certain prior procedures (spraying support materials, injections, or spraying insulating materials) to carry out said construction labor.

Another object of the invention is to erect constructions with a good thermal insulation and offering the conventional construction features.

Another essential object of the invention is to provide a prefabrication method that makes it possible to factory-produce moderate-cost panels and whereby, once the support material has been poured on-site, good gripping between the components of the wall so made will be obtained.

To that end the factory prefabrication method of the hollow panels of the invention makes use of a three-dimensional framework consisting of thrust-bars located in two substantially parallel planes, which are termed the form planes, and of link bars linking said thrust bars; in the present invention, the prefabrication procedure consists in:

placing said three-dimensional framework in a mold containing a pulverulent material so that the framework be immersed by part of its depth in said material and so the other part shall project above it;

molding an insulating synthetic material with adhesive properties when hardening into the volume between the upper surface of the pulverulent material and a form sheet located above the three-dimensional framework and kept in contact with it, this insulating material being molded in the liquid or pasty state so as to entirely fill the above cited volume for the purpose of embedding the thrust bars of the upper form plane of the three-dimensional framework and a portion of the link bars of same, said insulating material making contact with the above cited form sheet so as to ensure its adhesion to this sheet, and, following hardening of the insulating material, in extracting the pulverulent material and in ejecting the obtained panel.

Preferably an expanding insulating plastic shall be used, in particular polyurethane, which is made to expand in the above cited volume for the purpose of filling it with expanded foam; several implementing modes are possible and are part of the scope of the invention.

In a first implementing mode, the expanding insulating material is spread in the pasty state above the pulverulent material in a suitable amount to fill the mold volume after expansion, the form sheet then being positioned on said mold prior to the end of expansion of said insulating material.

In another implementing mode, the expanding insulating material is spread in the pasty state on the form sheet in a suitable amount to fill the mold volume after it expands, said form sheet then being overturned on the mold prior to the end of the expansion so that this expansion shall take place in the closed volume of said mold.

It is possible to combine the two implementing modes cited above: in that case one part of the insulating material is fed in the pasty state inside the mold over the pulverulent material and one part is fed in the pasty state on the form sheet, said slab then being turned over on the mold so that the parts will join during expansion and fill the closed mold volume with expanded foam.

In another mode of implementation, the form sheet is placed on the mold before the insulating plastic will be fed, this plastic then being injected into the closed mold volume with expanded foam.

The method of the invention allows making a hollow panel comprising:

a three-dimensional structure consisting of thrust bars located in two substantially parallel form planes and of link bars connecting these thrust bars and fixed on them, a molded, insulating-material plate, embedding the thrust bars of one of the form planes, said plate being of a thickness less than that of the three-dimensional structure so as to retain a free space on the side of the other form plane, and a form sheet which at the first form plane adheres against the corresponding side of the insulating plate.

After mold ejection, and preferably at the factory, a second form sheet is fastened to the thrust bars of the form plane that remained visible; this second sheet can be held in place either detachably to be removed and recovered after the on-site pouring of the concrete, or in definitive manner (in particular by hooking) to act as permanent formwork. It can be a perforated structure and in particular it may consist of an expanded metal plate or a grid.

Preferably the first form sheet put in place when the panel is being molded will be a rigid continuous sheet with an outer surface finish of the plasterboard type.

The three-dimensional framework can be fabricated by very simple bending operations, as will be discussed further below, and is sized so as to ensure the undeforming nature of the panel, without any function in the subsequent strength of the finished construction (this function being met by the support material poured on-site into the hollow volume of the panel). Said three-dimensional framework therefore can be exceedingly lightweight, whereby, in the absence of any solid or dense element, the panel of the invention offers a reduced weight and may cover several square meters while nevertheless being handled by one or two men.

The on-site implementation consists in arranging the panels in juxtaposed positions and in conventionally pouring concrete into the hollow volume bounded by the insulating layers and the second form slabs of the juxtaposed panels. Finishing the visible surfaces thereafter is assured by conventional procedures (rough cast, plaster applications . . . ) without the need of caring for visible joints.

Also, when the panel is being factory-molded, preferably a pulverulent material based on sand and quarry-run aggregates are used in the prefabrication mold: in this manner, after ejection, the free inside surface of the insulating material evinces a granular state due to the adhesion and partial cladding of the particles of the said pulverulent material on said insulating material. When pouring the concrete on-site, such a surface ensures excellent bonding between the concrete and the insulating layer of the panels.

The invention also covers prefabrication equipment to implement the above-defined method. Said equipment essentially comprises at least one mold consisting of vertical sides and of a bottom provided on one hand with mobile-aperture baffles to evacuate the pulverulent material, and on the other hand with support means for the three-dimensional framework at its lower form plane.

Said equipment furthermore may be supplemented by a bending system in order to produce a three-dimensional framework from a lattice; in the present invention, this bending system essentially comprises a plurality of carriages hinging one behind the other about parallel shafts, support means for said carriages guiding these in translation perpendicularly to the direction of their hinging shafts, several drive members each designed to permit the pivoting motion of a pair of adjoining carriages with respect to the contiguous carriages in order to impart a broken-line shape to the set of carriages, and means on each of the carriages for locking the bars which must be folded.

As will be more clearly understood further below, such a bending system differs by its operational principle from known devices for the same purpose (in particular the U.S. Pat. No. 3,825,163, and the Belgian Pat. No. 720,451 or the German Pat. No. 1,912,676) and it makes it possible to bend bars using only moderate power without drawing the metal while nevertheless being simple in strucutre and of moderate cost; furthermore after the bars have been bent, the system acts as a jig on which the structure may stay in position so the bracing bars definitively rendering said three-dimensional framework underforming can be welded onto it.

The invention having been outlined above, the description below will make clear other features, purposes and advantages, in relation to the attached drawings which are provided in illustrative and non-limiting manner, and which are an integral part of the present description:

FIG. 1 is a section through a vertical plane of one embodiment of a prefabricated hollow panel of the invention;

FIG. 2 is a partial schematic of the three-dimensional framework of this panel;

FIG. 3 is a partial perspective schematic of this panel, showing two possible fastening modes of the second form sheets;

FIGS. 4 and 5 are schematic detail views of each of these fastening modes repectively shown in section through planes A and B;

FIG. 7 is a schematic of a vertical section through a plane CC of a mold for molding a panel of the invention;

FIG. 8 is a view of said mold in vertical section through a plane DD orthogonal to the above plane, the lid-panel being assumed in the open position;

FIG. 9 is a schematic view of molding equipment comprising two molds of the type shown in FIGS. 7 and 8;

FIG. 10 is a detailed section through a plane EE of said equipment;

FIG. 11 is a partial vertical section through a plane FF of an embodiment of a bending system making it possible to fabricate a framework of the type schematically shown in FIG. 2;

FIG. 12 is a top view of this bending system;

FIG. 13 is a partial vertical section with the system assumed in operation;

FIGS. 14 and 15 are detailed sections through a plane G, the system being assumed respectively in the locked and unlocked positions.

Figure 6A:
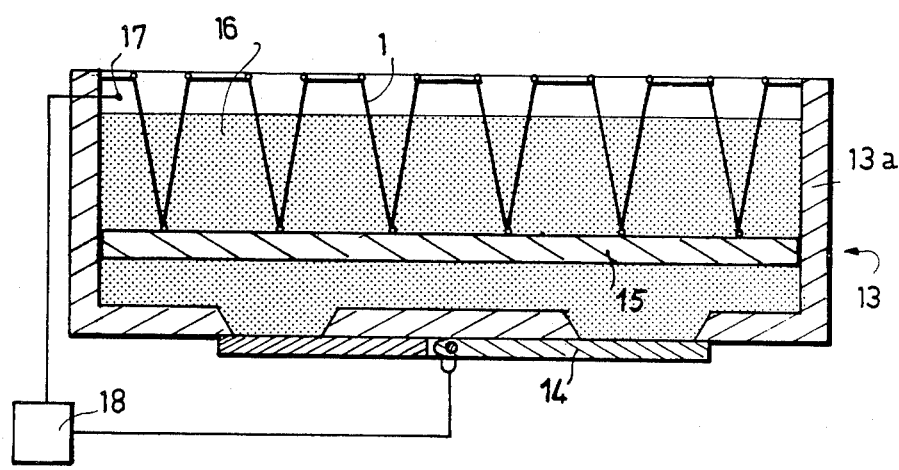
FIGS. 6a and 6b illustrate the molding principle for said panel.

The prefabricated hollow panel illustratively shown in FIG. 1 is to be used to erect walls by means of simple conventional methods of pouring concrete and finishing the outside surfaces.

This panel is made at the factory employing a method described in detail further below and comprises a three-dimensional framework 1 linking two form sheets 2 and 3; the form sheet 2 is joined to this framework through an insulating plate 4, in particular made of polyurethane foam adhering to the inside of the form sheet 2 and into which are partly embedded the bars of the three-dimensional framework 1.

The framework 1 is a lightweight structure which does not contribute to the strength of the work to be implemented by the panel and its sole function is to ensure the non-deforming character of the panel during shipping and handling and to keep the sheet 3 at a constant spacing from the set of insulating plate 4 and first form sheet 2.

Thus the panel bounds an inside hollow volume of a thickness which is substantially constant between the free surface 4a of its insulating plate 4 and the inside of the second form sheet 3. As will be seen further below, the panel fabrication method makes it possible to obtain a free surface 4a evincing a granular state with aggregate particles partly embedded in the surface so as to permit excellent gripping to the concrete which will ultimately be poured on-site into the hollow volume V of the panel.

The first form sheet 2 in this example is a continuous plate which in particular can be plasterboard to provide the inside wall surface; obviously other known materials can be used depending on the given application.

The second form sheet 3 can be of one piece or perforated, and in particular is may consist of an expanded metal plate or a fine ribbed plate made of plastic. This form sheet 3 is fixed on the three-dimensional framework 1 by any means whether in its definitive position to act as a permanent formwork to be cladded during the finishing work, or in a removable position to be recovered after the concrete has been poured into the volume V of the panel.

The three-dimensional framework 1 can be made of any material that will be capable of ensuring the above cited property of staying in place while being of low weight.

This framework in particular can be made starting with a metal lattice which is bent in a manner described further below to endow it with the schematically shown shape of FIG. 2. In this embodiment, the framework comprises a plurality of horizontal thrust bars 5 and 6 subtending two layers located in two parallel planes called the form planes. The thrust bars 5 of one of the form planes are linked to the thrust bars 6 of the other form plane by link bars 7 bent in the manner of a V. In this example, the link bars assume the shape of a sequence of trapezoids (without bases), though other shapes may be used, in particular a sequence of triangles (without bases).

Such a framework can be obtained from a lattice consisting of two sets of intersecting bars by bending the bars of one set (which shall be link bars) at their intersections with the bars of the other set (that will be the thrust bars) so as to form the two layers of thrust bars spaced apart by the link bars.

After they are bent, the thrust bars (5 and 6) of each layer are linked to bracing bars 8 or 9 whereby the framework becomes undeforming and any danger of opening the bends of the link bars is eliminated. Depending on the size of the panel to be made, two or three bracing bars per layer suffice to assure this bracing function.

The above described panel consists of lightweight elements whereby its overall weight is low and whereby the panel can be easily shipped and handled without resort to hoisting machinery. Its set-up on-site allows substantial time savings by eliminating the manufacture of the conventional forms; it is enough to juxtapose the panels to cover the construction surfaces and to pour concrete (cement concrete, reinforced concrete, foamed concrete etc . . . ) into the hollow panel volumes. This set-up requires no injection at all of insulating material or pressurized casting, and is accessible to any contractor having conventional equipment. After the concrete has been poured, the prefabricated panel together with the thickness of the concrete forms an integral solid walls (especially due to the excellent bonding made possible by the granular surface of the insulating plate) evincing the properties of a conventional wall.

FIGS. 3, 4, and 5 show implementing modes for fastening the form sheet 3. In these examples, a form sheet provided with ribs such as 10 comprising apertures 10a are used. These U- or V-shaped ribs may be ready-made or they can be obtained by deforming the sheet in particular as regards expanded metal, grids, sheetmetal . . . , the apertures 10a being achieved by means of punches or by transversally grinding said ribs.

The right hand part of FIG. 3 and of FIG. 4 show a fastening system implemented by a cotter-member consisting of simple vertical bars 11; the ribs of the sheet 3 are made to straddle the thrust bars 6 of the three-dimensional framework at their apertures 10a, and the cotter bars 11 are introduced in said ribs so as to pass to the rear of the bars 6.

The left-hand part of the FIG. 3 and of the FIG. 5 show another fastening system implemented by cotters 12 positioned similarly to the previous case. In this example, the cotters comprise a rod with a shape such as shown in FIG. 5 in order to act as spring means separating each thrust bar 6 from the bottom of the rib 10. Each cotter 12 furthermore comprises a loop to remove it by traction, so that the form sheet 3 can be easily recovered on-site following pouring and setting of the concrete. This fastening is especially significant with respect to higher-cost form sheets (integral sheets made of steel or plastic) in order to reduce construction costs. The finishing layer then is directly applied on the visible side of the concrete poured into the panels.

Figure 6B:
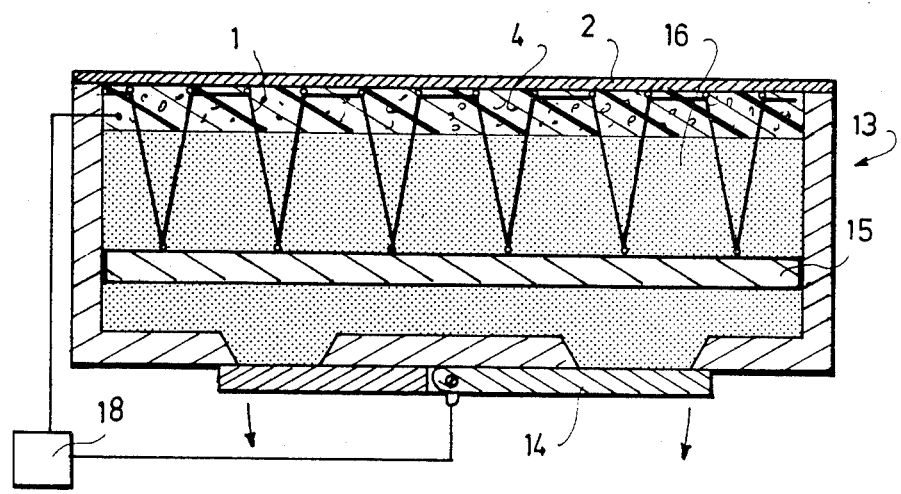

The FIGS. 6a and 6b schematize the principles of prefabricating a panel of the invention in a mold 13 consisting of vertical sides 13a and a bottom provided with mobile opening baffles 14 to evacuate the pulverulent material and of support means 15 for the three-dimensional framework (these means 15 may be the very bottom of the mold, or, as shall be seen further below, for a preferred embodiment, they may be in the form of small beams in the mold plumb with planes containing the link bars of the three-dimensional framework).

The method of the invention consists in placing a three-dimensional framework 1 in the mold 13 and in partly embedding it in a pulverulent material 16 based on sand and quarry-run aggregates (FIG. 3a). That part of the framework 1 projecting above the pulverulent material 16 will be embedded in the expanded polyurethane foam.

Thereupon the polyurethane 4 is made to expand above the pulverulent material 16 and the form sheet 2 is placed above the mold to cap same and close the expansion volume of the polyurethare (FIG. 3b).

The polyurethane can be directly spread within the mold 13 above the pulverulent material 16 before the form sheet 2 is set in place or it can be spread on the form slab supported by a lid-panel which then is shut down over the mold, with the two procedures lending themselves to being combined.

Again it is also possible to close the mold using the form sheet 2 prior to supplying the polyurethane, this supply then being implemented in the form of injection through orifices in the vertical sides 13a of the mold.

The amount of supplied polyurethane is so chosen as to fill the empty mold volume with expanded foam which will make contact with the form sheet 2 so as to adhere to it due to its adhesive properties.

A pressure pickup or sensor 7 can be provided within the hollow mold volume to permit measuring the pressure at the end of expansion (this pickup also being combined if desired with the form sheet 2 in order to directly measure the pressure applied to same at the end of expansion). This pickup or sensor 17 is connected to a control system symbolically shown at 18 to allow gradually opening baffles 14 by means of a conventional actuation device controlled by the system 18. In this manner, once a given pressure threshold in the mold has been exceeded, (for instance about 0.1 to 0.2 bars gauge), evacuation of the pulverulent material will be provided; in this manner, the dangers of raising the form sheet 2 are eliminated by slightly lowering the surface of the pulverulent material, and this form sheet 2 constantly stays in contact with the upper form plane of the three-dimensional framework 1.

The FIGS. 7, 8, 9 and 10 show a molding embodiment making it possible to use the method described above.

In this example, this equipment comprises two molds of the type shown in FIGS. 7 and 8. These figures denote the same elements by the same reference numerals as in the previous figures. In particular the opening baffles 14 are shown again, which evacuate the pulverulent material and which are controlled (using a conventional mechanical system) by a motor 19, and also at 15 the support beams for the three-dimensional framework 1 which are borne on movable jack rods 20 arranged to raise as needed these beams within the mold (safety bellows prevent the pulverulent material from making contact with the rods 20).

The molds are combined with a lid-panel 21 designed to support a form-sheet 2; this lid-panel is arranged so it can be brought down with a 180° reversal.

In this example, the same lid-panel is used for two molds and the covering motion is carried out either about a removable spindle 22 when same is to one side of the lid-panel or about a spindle 22' on the other side.

Furthermore the lid-panel 21 is provided with means for retaining the form sheet placed on it. These means may be suction chambers 23 communicating with a suction source 24.

The panel prefabrication method using such molds consists in first arranging the three-dimensional framework 1 in the empty mold on the small beams 15 located at the bottom, the mold being of a height exceeding the thickness of said framework; the baffles 14 being closed, the pulverulent material is then poured into the mold until the three-dimensional framework is embedded across its entire height. The surface of the pulverulent material 16 then can be conveniently smoothed so as to be horizontal and substantially plane. The small beams 15 next are actuated to raise the framework within the mold in order to make its upper part emerge from the pulverulent material and be flush with the upper mold side. The polyurethane supply then can be provided as previously described, either directly into the mold or above the form sheet 2, or by combining the two procedures.

After the lid-panel 21 has been shut down and the polyurethane has completely expanded and hardened, the suction source 24 is taken out of service; the lid-panel 21 is raised and the baffles 14 are opened to evacuate pulverulent material 16 in order to eject the prefabricated panel.

To avert involved handling of the pulverulent material, two panels are alternatingly molded in the two molds of this equipment (they are schematically shown at 13 and 13' in FIG. 9), these molds being consecutively arranged one above the other (solid or broken lines), whereby the pulverulent material extracted from the upper mold at the end of the fabrication of the corresponding panel shall flow into the lower mold for the purpose of starting the fabrication of the other panel.

To that end, the molds 13 and 13' are supported by guidance means designed to superpose them, whereby either mold can be placed above or below the other. Obviously many systems are feasible and the FIGS. 9 and 10 only show one non-limiting example.

In this example, each mold is provided at its sides with outer rollers 26 moving within U-shapes 25 forming an X-shaped rolling path. At the intersection, a slider strip 27 provided with two slanted platelets 28 and 29 implements the continuity of the rolling path of either U-shape.

Also, the prefabrication equipment preferably comprises an improved bending system of the type shown in FIGS. 11, 12, 13, 14 and 15 for the purpose of making a three-dimensional framework from a lattice consisting of two sets of perpendicular bars.

This machinery comprises a plurality of carriages such as 30 equal in number to the number of rectilinear segments of the link bars of the framework to be manufactured. These carriages are held in rolling paths 31 whereby they can move in a longitudinal direction parallel to the line of carriages while leaving them the possibility of being raised. A single carriage located at the end of the line is locked in the longitudinal direction. Furthermore, the carriages 30 are consecutively articulating by means of shafts 32 which are perpendicular to the cited longitudinal direction.

The carriage pairs such as 30a and 30b corresponding to the location of a V-bend to make in the link bars of the three-dimensional framework render it possible to pivot them with respect to the neighboring carriages (30c and 30d in this example) in order to impart the shape of a broken line to the line of carriage that corresponds to the shape of the link bars of the framework.

In this example, each drive member for a carriage pair 30a, 30b comprises a short-excursion jack 33 arranged to act perpendicularly to the carriage line in order to initiate the lifting of the two carriages, and a jack 34 coupled to the neighboring carriages 30c, 30d to make these carriages come closer or move apart.

The low-excursion jack 33 is borne on the bottom of a guidance sleeve 35 in turn supported by roller means 36 acting in concert with the rolling paths 31: this sleeve 35 guides a vertical column 37 subject to the action of the jack 33 when in the low position.

This column 37 is plumb with the hinge means between the two carriages 30a and 30b and is prolonged at its upper part by a fork 38 linked to the articulation shaft between the carriages. On its arms this fork is provided with grooves such as 38a which are perpendicular to the longitudinal direction of the carriages so as to contain and guide the thrust bars of the three-dimensional framework; in this manner the fork 38 forms a guidance member for those bars and keeps them in place with respect to one another when they are being folded.

Moreover, grooved rollers 39 are arranged near the articulation between the two carriages 30a and 30b for the purpose of guiding the link bars at the top of their folds.

Also, the carriages 30 are provided with means for locking the link bars whereby the latter are stabilized on said carriages when the bending takes place.

In the example shown, these means consist of brackets 40 each with a leg 40b located opposite the edge of the carriage under consideration (or of the rim of aperture in this carriage). Each bracket 40 hinges about a support 41 so as to pivot upward (FIG. 15) or downward (FIG. 14), this support 41 itself resting on slide rods 42 by means of which it can be moved away from or be brought nearer the carriage.

In this manner the bracket 40 can be placed in the locking position schematically shown in FIG. 14 to keep the link bars resting against the corresponding carriage or in the open position schematically indicated in FIG. 15 to free these bars. A spring 43 assures that the bracket 40 shall pivot upward during the opening. Also, a locking member (omitted) is provided to keep the bracket in the locked position.

The bending is implemented using the above described machinery and the following procedure: the carriages 30 being aligned on the rolling paths and the brackets 40 being in the open position, the lattice is placed on said carriages, so that the bars which shall be the thrust bars pass into the grooves 38a of the forks 38 and the perpendicular bars, called on to become the link bars, rest on the carriages and pass into the grooves of the rollers 39. Obviously the carriage width corresponds to that of the lattice, and the carriages comprise as many brackets 40, rollers 39 and forks 38 as there are link bars in the lattice.

The brackets 40 located near the fixed end carriage are locked and the first bend can be obtained by actuating the corresponding jacks 33 and 34; while the bending takes place, the downstream carriages move along the rolling paths in the direction of the bend.

All the lattice bends are made in this manner from one to the next.

At the end of the overall bending, the lattice has assumed the shape of the three-dimensional framework schematically shown in FIG. 2 and is now kept in the machinery in its definitive shape. Thereupon the bracing bars 8 and 9 can be welded on, the framework being taken off the bending machinery only after this operation which freezes it in its final state.

Obviously the invention is not restricted to the terms of the above description but covers all of its variations. In particular the set-up implementing mode consisting in raising the three-dimensional framework so part of it can project above the pulverulent material may be modified, the relative displacement between the framework and the pulverulent material being achieved by lowering the surface of the latter, for instance using a mold with a mobile bottom wherein the framework is kept motionless.

I claim:

1. A pre-fabricated hollow panel, comprising:
   (a) a three dimensional framework including a plurality of thrust bars arrayed in two generally parallel form planes with link bars connecting and fastened to said thrust bars;
   (b) a molded insulating material plate surrounding said thrust bars of one of said form planes, said plate having a substantially uniform thickness less than said framework thickness for providing a free space adjacent said other one of said form planes;
   (c) a form sheet adhered to said thrust bars of said one form plane in cooperation with said plate;
   (d) said plate having an inside free surface; and,
   (e) a plurality of aggregate particles substantially embedded in said free surface for providing a granular texture thereto.

2. The panel as defined in claim 1, wherein:
   (a) a second form sheet is secured to said thrust bars of said other one of said form planes.

3. The method of preparing a factory assembled prefabricated hollow panel for use in erecting insulated structures, comprising the steps of:
   (a) providing a three dimensional framework including thrust bars arrayed in at least two generally parallel form planes defining said framework thickness and with link bars connecting said thrust bars;
   (b) placing said framework in an empty horizontal mold having a height exceeding said framework thickness;
   (c) filling said mold with a pulverulent material whereby said framework is embedded throughout its thickness and an upper surface of said pulverulent material is disposed above an upper one of said form planes;
   (d) smoothing said upper surface substantially plane;
   (e) exposing at least said thrust bars of said upper form plane by removing a portion of said pulverulent material from around a portion of said embedded framework while maintaining said upper surface substantially smooth whereby a portion of said framework remains embedded in said pulverulent material and another portion thereof projects beyond said upper surface;
   (f) closing said mold with a form sheet contacting said thrust bars of said upper form plane for thereby providing a bounded volume between said upper surface and said form sheet;
   filling said bounded volume with a generally fluidic expandable synthetic insulating material for embedding therein said thrust bars of said upper form plane and a portion of said link bars and whereby said insulating material is adapted for adhering to said form sheet;
   (h) hardening said insulating material; and,
   (i) removing the panel obtained thereby.

4. The method as defined in claim 3, including the further steps of:
   (a) providing said mold with means for selectively evacuating therefrom said pulverulent material; and,
   (b) evacuating a portion of said pulverulent material for adjusting said upper surface height for thereby exposing at least said thrust bars of said upper form plane.

5. The method as defined in claim 4, wherein:
   (a) said means for selectively evacuating said pulverulent material includes mobile opening baffles disposed below said mold bottom and adapted for gravitationally evacuating said pulverulent material when opened.

6. The method as defined in claim 3, including the further steps of;
   (a) providing a plurality of beams in said mold for supporting said framework thereon;
   (b) providing said mold with means for vertically displacing said beams for thereby displacing said framework; and,
   (c) upwardly displacing said beams for thereby exposing at least said thrust bars of said upper form plane and for thereby contacting said thrust bars of said upper form plane with said form sheet.

7. The method as defined in claim 6, wherein:
   (a) said means for vertically displacing said beams includes movable jack rods.

8. The method as defined in claim 6, wherein:
   (a) said beams are spaced apart for permitting said pulverulent material to flow therebetween.

9. The method as defined in claim 3, including the further step of:
   (a) substantially evacuating said pulverulent material from said mold prior to removal of said panel therefrom.

10. The method as defined in claim 5, including the further steps of:
    (a) providing said mold with pressure sensing means for measuring said insulating material pressure during expansion thereof; and,
    (b) evacuating said pulverulent material from said mold after said pressure exceeds a predetermined threshold.

11. The method as defined in claim 10, wherein:
    (a) said pressure sensing means cooperates with said means for evacuating said pulverulent material for controlling operation thereof whereby said baffles are gradually opened for slightly lowering said upper surface after said threshold is exceeded.

12. The method as defined in claim 11, including the further step of:
    (a) regulating lowering of said upper surface for preventing raising of said form sheet from said mold for thereby maintaining contact of said form sheet with said framework.

13. The method as defined in claim 3, including the further steps of:
    (a) bending said link bars at the point of intersection with said thrust bars for thereby obtaining two layers of thrust bars connected by generally V-shaped link bars; and,
    (b) connecting said thrust bars of each layer with bracing bars for thereby preventing spreading of said thrust bars.

14. The method as defined in claim 3, wherein:
    (a) said pulverulent material consists essentially of sand and quarry-run aggregates for providing said insulating material with an internal free surface having a granular textured surface.

15. The method as defined in claim 3, including the further steps of:
    (a) providing a first mold above a second one thereof;
    (b) forming a panel in said first mold;
    (c) evacuating said pulverulent material from said first mold; and,
    (d) providing said evacuated pulverulent material to said second mold for thereby embedding at least a portion of a framework disposed therein.

16. The method as defined in claim 3, including the further step of:
    (a) placing a second form sheet against said thrust bars of said other one of said form planes after removal of said panel from said mold.

17. The method as defined in claim 16, including the further steps of:
    (a) providing said second form sheet with ribs and aligned apertures therethrough; and,
    (b) fastening said second form sheet to said framework whereby said thrust bars extend through said apertures and cotter members cooperate therewith for linking said thrust bars between said ribs.

18. The method of preparing a factory assembled pre-fabricated hollow panel for use in erecting insulated structures, comprising the steps of:
    (a) providing a three dimensional framework including thrust bars arrayed in at least two generally parallel form planes defining said framework thickness and with link bars connecting said thrust bars;
    (b) placing said framework in an empty horizontal mold having a height exceeding said framework thickness;
    (c) filling said mold with a pulverulent material whereby said framework is embedded throughout its thickness and an upper surface of said pulverulent material is disposed above an upper one of said form planes;
    (d) smoothing said upper surface substantially plane;
    (e) exposing at least said thrust bars of said upper form plane by removing a portion of said pulverulent material from around a portion of said embedded framework while maintaining said upper surface substantially smooth whereby a portion of said framework remains embedded in said pulverulent material and another portion thereof projects beyond said upper surface;
    (f) providing a form sheet generally adjacent said mold;
    (g) disposing a predetermined amount of a generally fluidic expandable synthetic insulating material on a top surface of said form sheet;
    (h) inverting said form sheet;
    (i) closing said mold with said inverted form sheet for thereby providing a bounded volume for said mold between said upper surface and said top surface whereby said top surface contacts said thrust bars of said upper form plane and said insulating material embeds therein said thrust bars of said upper form plane and a portion of said link bars and whereby said insulating material is adapted for adhering to said form sheet;
    (j) hardening said insulating material; and,
    (k) removing the panel obtained thereby.

19. The method as defined in claim 18, including the further step of:
    (a) permitting substantial expansion of said insulating material prior to inverting said form sheet.

* * * * *